Aug. 17, 1937.  R. T. NEWTON  2,090,141
INDIVIDUAL FRONT WHEEL SPRING DEVICE
Filed May 20, 1935
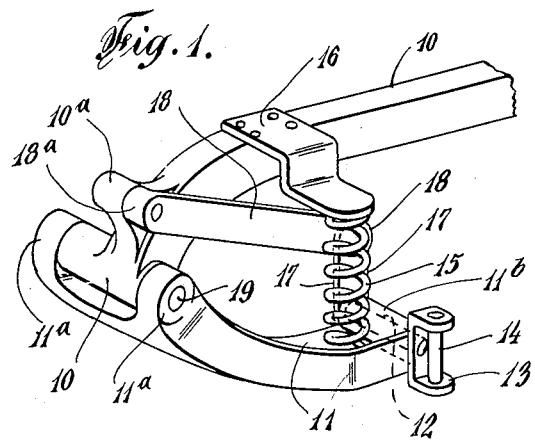
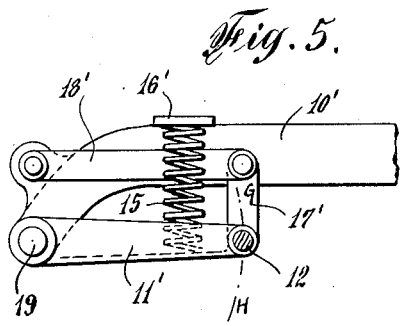
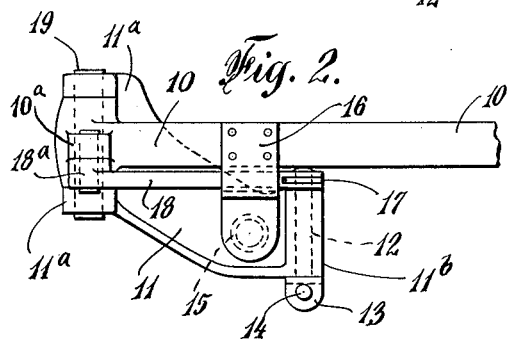
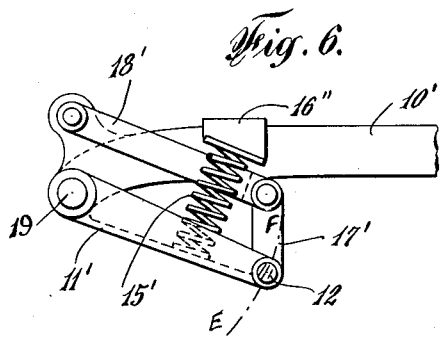
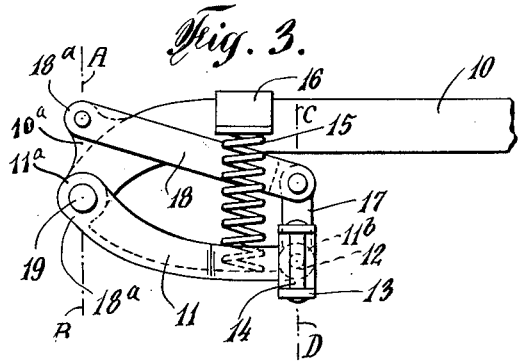
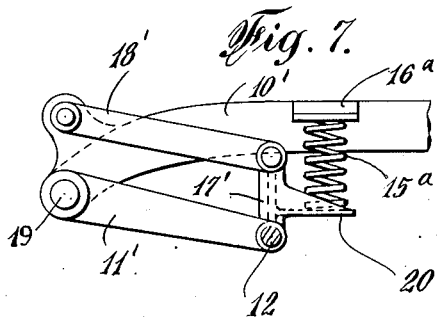
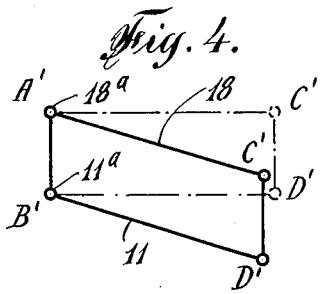
INVENTOR.
RICHARD T. NEWTON
BY
ATTORNEY Patented Aug. 17, 1937

2,090,141

UNITED STATES PATENT OFFICE 2,090,141

INDIVIDUAL FRONT WHEEL SPRING DEVICE

Richard T. Newton, Oyster Bay, N. Y.

Application May 20, 1935, Serial No. 22,312

6 Claims. (Cl. 267—20)

This invention relates to new and useful improvements in an individual front wheel spring device for motor vehicles.

The invention contemplates the construction of an individual front wheel spring device which is composed of a parallelogram of arms associated with the side element of the chassis of a vehicle, and arranged to maintain a wheel yoke in the vertical, in all pivoted positions of the parallelogram of arms.

More particularly, the invention contemplates arranging the parallelogram of arms in such a manner that a wheel yoke shaft may be turnably and horizontally mounted on one of the arms and transversely of the longitudinal direction for supporting a wheel yoke; and another one of the parallelogram arms being connected with the wheel yoke shaft to turn the shaft for maintaining the wheel yoke in the vertical position in all pivoted positions of the parallelogram of arms.

Another one of the objects of this invention is to associate resilient means with the parallelogram of arms to hold them in a normal position.

Still further, the invention proposes an arrangement wherein said normal position is one in which the superimposed arms, of the parallelogram of arms, are on the horizontal. This arrangement reduces to a minimum the variation in the longitudinal distance which the wheel yoke is moved during the pivoting of the arms of the parallelogram.

Still further, the invention proposes an arrangement wherein said normal position is one in which the superimposed arms of the parallelogram are directed downwards and rearwards. With this arrangement the normal operation of the parallelogram of arms is one in which the speed of impact of the wheel carried by the wheel yoke, when engaging an irregularity of the road, is lessened as the wheel is given more time to mount the irregularity.

This invention further contemplates an arrangement wherein the resilient means is interposed between the side element of the chassis, and a part associated with the wheel yoke so that the resilient means is subjected to compressive stresses, with the seats thereof at all times in parallel alignment with each other.

Another object of this invention is the construction of a device as described which is simple and durable, and which may be manufactured and sold at a reasonable cost.

For further comprehension, of the invention and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a perspective view of a portion of a vehicle chassis equipped with a front wheel spring device according to this invention.

Fig. 2 is a plan view of Fig. 1.

Fig. 3 is a front elevational view of Fig. 1.

Fig. 4 is a schematic view of the parallelogram of arms shown in Fig. 3.

Fig. 5 is a side elevational view, similar to Fig. 3, but illustrating another embodiment of the invention.

Fig. 6 is another side elevational view similar to Fig. 3, but showing a still further embodiment.

Fig. 7 is another view similar to Fig. 3 showing a modification of the invention.

The numeral 10 indicates the front portion of the side element of a chassis frame of a motor vehicle. The invention consists of a long parallelogram arm 11 pivotally mounted at the front end 11a upon the front end of the chassis element 10 and provided with a bearing 11b at its rear end. A wheel yoke shaft 12 turnably engages through the bearing 11b, and at the front end supports the wheel yoke 13 in which the vertical pin 14 of the yoke is mounted. The parallelogram arm 11 is resiliently held by a spring 15 which is attached on a bracket 16 mounted on the side element 10.

A short parallelogram arm 17 is fixed to the free end of the wheel yoke shaft 12, and pivotally connects with a long parallelogram arm 18, which in turn is pivotally connected at the front end 18a upon the side element 10 in a vertical plane with the axis of the end 11a.

The arm 11 is formed with a bifurcated front end, the portions thereof engaging upon the opposite sides of the front end of the side element 10. A pin 19 engages between these parts to accomplish the pivotal connection of the arm 11 with the side element 10. Furthermore, the arm 11 is offset laterally when viewed from the top (see Fig. 2) so that the bearing portion 11b thereof is located to one side of the side element 10.

The bracket 16 extends over the offset end of the arm 11 in such a manner that the spring 15 engages in the vertical, between the bracket and the arm. The arm 17 extends in the vertical and pivotally connects with the rear end of the arm 18 which is straight and extends substantially along the longitudinal. The front end of the arm 18 is connected by a pin with a lug 10a on the side element 10, which construction comprises the pivotal connection between the arm 18 and the side element. The bracket 16 extends over the arm 18 so as not to interfere with the vertical motion thereof.

The axes of pivoting of the ends 11a and 18a are in a vertical plane, indicated by the line AB. The axes of the shaft 12 and the pivot between the arms 17 and 18, are also in a vertical plane, indicated by the line CD. Consequently, in all pivoted positions of the arms 11 and 18, the yoke 13 will maintain a true vertical position. This may perhaps be better understood from the schematic showing in Fig. 4. Since the short parallelogram arm A'B' is in the vertical and fixed, the short parallelogram arm C'D' will maintain the vertical position in all pivoted positions of the long parallelograms arms 11 and 18. The full lines in Fig. 4 show one possible position of the parallelogram of arms. The dot and dash lines indicate another possible position. It should be noted that the short parallelogram arm C'D' maintains the vertical position.

The front wheel spring device may be designed so that the parallelogram of arms has a normal position, depending upon the characteristics desired in the design. Fig. 5 shows one type of design in which the normal position of the long arms is on the horizontal. In this design the long arms are indicated by reference numerals 11' and 18'. The wheel yoke shaft 12 is rotative through the rear end of the arm 11' and fixedly connected with the short arm 17' which is pivotally connected with the rear end of the long arm 18'. The front end of the arms 11' and 18' are pivotally connected on the chassis side element 10'. A bracket 16' is mounted on the side element 10'. A spring 15' acts between the bracket 16' and the arm 11' to maintain the parallelogram of arms in the normal position illustrated on the drawing.

With this design the movement in the longitudinal direction of a wheel which is mounted upon a yoke (not shown on the drawing) fixed to the wheel yoke shaft 12 would be the same as with the conventional front springs now in use on motor vehicles. From an inspection of Fig. 4 it will be noted that while the yoke maintains the true vertical position, it moves slightly longitudinally during the pivoting of the parallelogram of arms, since the shaft 12 moves in the arc GH during the operation of the spring device.

In Fig. 6 another design is shown in which the normal positions of the long arms of the parallelogram are one in which they are directed rearwards and downwards. This design has several advantages, chief among them being that when a wheel, mounted on the wheel yoke, (not shown on the drawing) which is fixed on the shaft 12 moves over an irregularity in the road, the speed of impact will be lessened since the moving of the arms of the parallelogram will be such that the wheel has more time to mount the obstruction. This may be understood by noting that the shaft 12 will move in the arc EF. Since the vehicle is travelling frontwards, the wheel relative to the vehicle moves rearwards and upwards to mount the obstruction. For this reason the impact will be materially lessened. In this form of the invention the bracket which connects the spring 15' to the side element 10 is indicated by reference numeral 16". The other parts are identical to the parts previously described and may be recognized by the identical reference numerals.

In Fig. 7 a modification of the invention has been disclosed which distinguishes from the prior forms in the location of the resilient means. In this form, the resilient means is arranged between the side element 10' of the chassis and a part associated with the wheel yoke, in such fashion that during the normal operation of the parallelogram of arms the seats of the resilient means will be kept in parallel alignment with each other. The arrangement may be understood by noting that the resilient means comprises a helical spring 15a which is mounted between a stationary bracket 16a attached on the side element 10' and a seat member 20 which is rigidly attached to the arm 17'. The seat member 20 may be rigidly attached to the shaft 12, or the wheel yoke (not shown on the drawing) and still function in the same manner. The object is to associate the spring seat member 20 with the shaft 12 so that in all positions of the parallelogram of arms the seat member 20 will maintain its position of parallel alignment with the seat of the opening 15a on the bracket 16a. In other respects this form of the invention is similar to the prior forms and the same parts are indicated by the identical reference numerals. The spring 15a will thus be compressed axially, contrasted with the prior arrangements wherein the springs are compressed more on one side than on the other side. When the spring is axially compressed, the tendency for it to disengage from its seats is entirely eliminated.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit or the scope of the appended claims.

Having thus described my invention, what I claim as new, and desire to secure by United States Letters Patent is:—

1. An individual front wheel spring device for motor vehicles, comprising a side element of the chassis for said vehicle, superimposed parallelogram arms pivotally mounted in a vertical plane on said side element and extending substantially in the longitudinal direction, a wheel yoke shaft turnably and substantially horizontally mounted on one of said arms and transversely of the longitudinal direction, a wheel yoke on said shaft, a parallelogram arm in the vertical and fixed on said shaft and pivotally connected with the other of said parallelogram arms, and resilient means for holding the parallelogram of arms in a normal position, comprising a spring superimposed between said side element and the parallelogram arm which is in the vertical, whereby the spring seats at the ends of said spring will maintain parallel alignment in all positions of said parallelogram of arms.

2. An individual front wheel spring device for motor vehicles, comprising a side element of the chassis for said vehicle, superimposed parallelogram arms pivotally mounted in a vertical plane on said side element and extending substantially in the longitudinal direction, a wheel yoke shaft turnably and substantially horizontally mounted on one of said arms and transversely of the longitudinal direction, a wheel yoke on said shaft and pivotally connected with the other of said parallelogram arms, and resilient means for holding the parallelogram of arms in a normal position, comprising a spring interposed between said side element and a part associated with said wheel yoke shaft whereby the spring seats at the ends of said spring will maintain the parallel alignment with each other in all positions of pivoting of said parallelogram of arms.

3. An individual front wheel spring device for motor vehicles, comprising a side element of the chassis for said vehicle, superimposed parallelogram arms pivotally mounted in a vertical plane on said side element and extending substantially in the longitudinal direction, a wheel yoke shaft turnably and substantially horizontally mounted on one of said arms and transversely of the longitudinal direction, a wheel yoke on said shaft, a parallelogram arm in the vertical and fixed on said shaft and pivotally connected with the other of said parallelogram arms, and resilient means interposed between said side element and said latter-mentioned parallelogram arm.

4. An individual front wheel spring device for motor vehicles, comprising a side element of the chassis for said vehicle, superimposed parallelogram arms pivotally mounted in a vertical plane on said side element and extending substantially in the longitudinal direction, a wheel yoke shaft turnably and substantially horizontally mounted on one of said arms and transversely of the longitudinal direction, a wheel yoke on said shaft, a parallelogram arm in the vertical and fixed on said shaft and pivotally connected with the other of said parallelogram arms, and resilient means interposed between said side element and an arm fixedly mounted on said shaft.

5. An individual front wheel spring device for motor vehicles, comprising a side element of the chassis for said vehicle, superimposed parallelogram arms pivotally mounted in a vertical plane on said side element and extending substantially in the longitudinal direction, a wheel yoke shaft turnably and substantially horizontally mounted on one of said arms and transversely of the longitudinal direction, a wheel yoke on said shaft, a parallelogram arm in the vertical and fixed on said shaft and pivotally connected with the other of said parallelogram arms, and a vertical spring interposed between said side element and said latter-mentioned parallelogram arm.

6. An individual front wheel spring device for motor vehicles, comprising a side element of the chassis for said vehicle, superimposed parallelogram arms pivotally mounted in a vertical plane on said side element and extending substantially in the longitudinal direction, a wheel yoke shaft turnably and substantially horizontally mounted on one of said arms and transversely of the longitudinal direction, a wheel yoke on said shaft, a parallelogram arm in the vertical and fixed on said shaft and pivotally connected with the other of said parallelogram arms, and a vertical spring interposed between a horizontal seat on said side element and a horizontal seat on said latter-mentioned parallelogram arm.

RICHARD T. NEWTON.